May 3, 1960 H. D. CRANE 2,935,622

MAGNETIC CORE LOGIC ELEMENT

Filed June 12, 1958 2 Sheets-Sheet 1

INVENTOR.
HEWITT D. CRANE

BY Christie, Parker & Hale
ATTORNEYS

May 3, 1960 H. D. CRANE 2,935,622

MAGNETIC CORE LOGIC ELEMENT

Filed June 12, 1958 2 Sheets-Sheet 2

INVENTOR.
HEWITT D. CRANE

BY Christie, Parker & Hale

ATTORNEYS

United States Patent Office 2,935,622

Patented May 3, 1960

2,935,622

MAGNETIC CORE LOGIC ELEMENT

Hewitt D. Crane, Palo Alto, Calif., assignor to Burroughs Corporation, Detroit, Mich., a corporation of Michigan Application June 12, 1958, Serial No. 741,691

7 Claims. (Cl. 307—88)

This invention relates to magnetic core devices, and more particularly is concerned with a magnetic core device for use in binary logic circuits.

The use of ferrite cores in memory circuits and in binary logic circuits is well known. Ferrite is a magnetic material characterized by a high degree of magnetic flux remanence, such that the remanent flux is almost as great as the saturated flux. Due to this property, a core can be substantially saturated with flux in one direction or the other, with the direction of flux being indicative of whether a binary zero or a binary one is stored in the core. Various circuit arrangements have been devised for utilizing this property of ferrite cores in developing memory circuits and logic circuits.

In copending application Serial No. 698,633, filed November 25, 1957 in the name of Hewitt D. Crane and assigned to the assignee of the present invention, there is described a core register having a novel transfer circuit requiring no diodes or other impedance elements in the transfer loops between cores. The basic binary storage element of this circuit is an annular core having small input and output apertures. The binary zero digit is stored in the form of flux oriented in the same direction in the core on either side of the respective apertures, while the binary one digit is stored in the form of flux extending in opposite directions on either side of the respective apertures. Transfer is effected by applying a current pulse of predetermined magnitude to a coupling loop linking one aperture in each of two cores, one core constituting a transmitting core and the other core constituting a receiving core. Each core acts as a binary storage device and the binary information stored may be shifted from core to core as required.

It may be desirable in the design of logic circuits to convert a binary one into a binary zero, or vice versa, in the process of storage and transfer. Circuits for doing this are sometimes called converter or negation circuits. The negation function can be accomplished in a magnetic core element as part of a transfer circuit in the manner described in copending application Serial No. 703,003, filed December 16, 1957 in the name of Hewitt D. Crane and assigned to the assignee of the present invention. In contrast to the storage element for straight transfer as mentioned above, the negating core element stores flux patterns around the input aperture and the output aperture which always represent different binary digits and not the same binary digits, as in the core element of the first mentioned copending application. The core element used for the negation circuit is quite different in shape from the simple annular core element used in the straight transfer type of core circuit and is characterized by the fact that it has an additional shunting flux path in which flux is normally held in one direction by an applied D.C. bias.

It is highly desirable to have a single core element which, by simple wiring change, can function either as a straight transfer core element, hereafter referred to as a "positive" core device, or as a negating core element, hereafter referred to as a "negative" core device. By the present invention, a ferrite magnetic core element is provided which functions logically as either a positive core device or a negative core device, requiring only simple change in wiring to effect the desired function.

In brief, the invention provides a magnetic storage device comprising a substantially annular core of magnetic material having a square hysteresis characteristic, the annular core forming a rather long closed magnetic flux path. The core is enlarged in at least two regions of the closed flux path, the enlarged regions each having at least two apertures extending through the core. The apertures define three parallel flux paths in each of the enlarged regions of the core and form relatively short closed magnetic flux paths within the enlarged regions. Input and output windings link individual ones of the parallel flux paths in the enlarged regions of the core through separate apertures located respectively in the two enlarged regions. Holding windings link the core through separate apertures respectively located in the two enlarged regions, the holding windings having unidirectional holding currents passed therethrough. A clearing winding links the core through the central opening formed by the annular shape of the core for inducing flux in one direction around the relatively long closed flux path. On modifying the direction the current passing through the various hold windings and clear windings of the core, the core can be made to function either as a positive core device or a negative core device.

For a better understanding of the invention, reference should be had to the accompanying drawings wherein.

Figure 1:
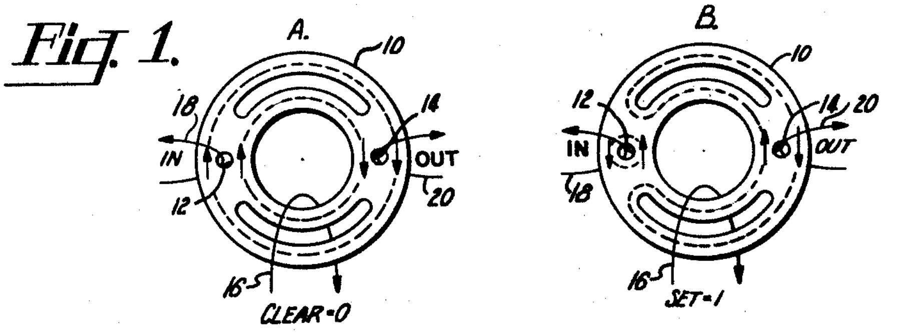
Figs. 1 and 2 show core elements used heretofore in providing straight transfer and providing negating transfer respectively.

Consider an annular core, such as indicated at 10 in Fig. 1, made of magnetic material, such as ferrite, having a square hysteresis loop characteristic, i.e., a material having a high flux retentivity or remanence. The annular core is preferably provided with two small apertures 12 and 14, each of which divides the annular core into two parallel flux paths as indicated by the arrows of Fig. 1A. If a large current is pulsed through the central opening of the core 10, as by a clearing winding 16, the flux in the core may be saturated in a clockwise direction. The core is then said to be in a cleared or binary zero condition.

If a current is passed through either of the apertures 12 or 14, as by either of the windings 18 or 20, in the direction indicated in Fig. 1B, and the current is of sufficient magnitude to cause switching of flux around the central opening of the annular core, a portion of the flux can be reversed so that the flux extends in opposite directions on either side of the respective apertures 12 and 14, as indicated by the arrows in Fig. 1B. The core is then said to be in the set or binary one state.

The significant aspect of the transfer circuit using the core elements of Fig. 1, as described in detail the copending application Serial No. 698,633 mentioned above, is that with a given number of turns linking one of the small apertures in the core and with the core in its cleared state as shown in Fig. 1A, a current exceeding a threshold $I_t$ must be provided to change the core to its set state as shown in Fig. 1B. If the current does not exceed this threshold level, substantially no flux is switched around the core. The aperture is said to be "blocked" when the current passing through the aperture must exceed the threshold value $I_t$ in order to switch any flux in the core element.

On the other hand, if the core is already in its set state, a very small current, substantially less than the threshold value $I_t$, causes flux to switch locally about the aperture. In this case the aperture is said to be "unblocked." Thus if a current slightly less than the threshold current $I_t$ is passed through an aperture in a core element, flux will be switched or not switched within the core depending upon whether the core is in its cleared state or its set state, i.e., depending upon whether the aperture is blocked or unblocked.

To provide a negation function, a core element in which the input aperture is blocked and the output aperture is unblocked must be established in the cleared condition. This is accomplished by the core element and associated circuit of Fig. 2. The negating core element 22 is provided with a central leg 24 having a hold winding thereon for maintaining the flux in one direction in the central leg 24. A clear winding 26 not only links the core but links the output aperture 28. Thus when the negating core element 22 is cleared, the input aperture 30 is blocked and the output aperture 28 is unblocked. Only if a current exceeding the threshold level $I_t$ is applied to an input winding 32 linking the input aperture 30 can flux be switched at the output aperture 28. As a result the output aperture becomes blocked. Thus it will be seen that the negating core element of Fig. 2 provides the opposite output condition from the straight transfer core element of Fig. 1.

Figure 2:
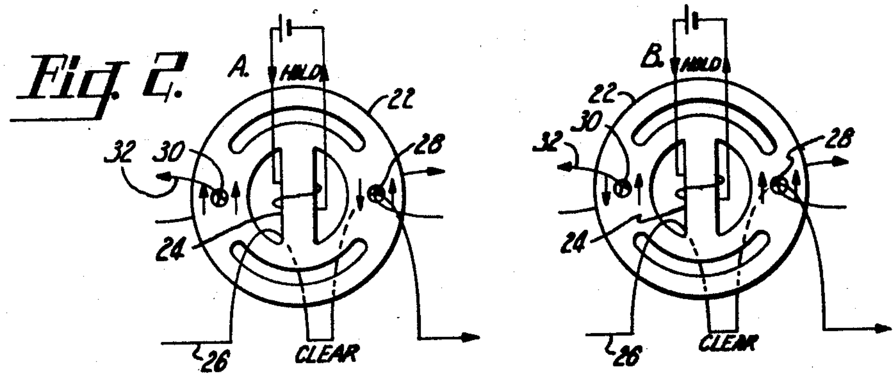
Figure 3:
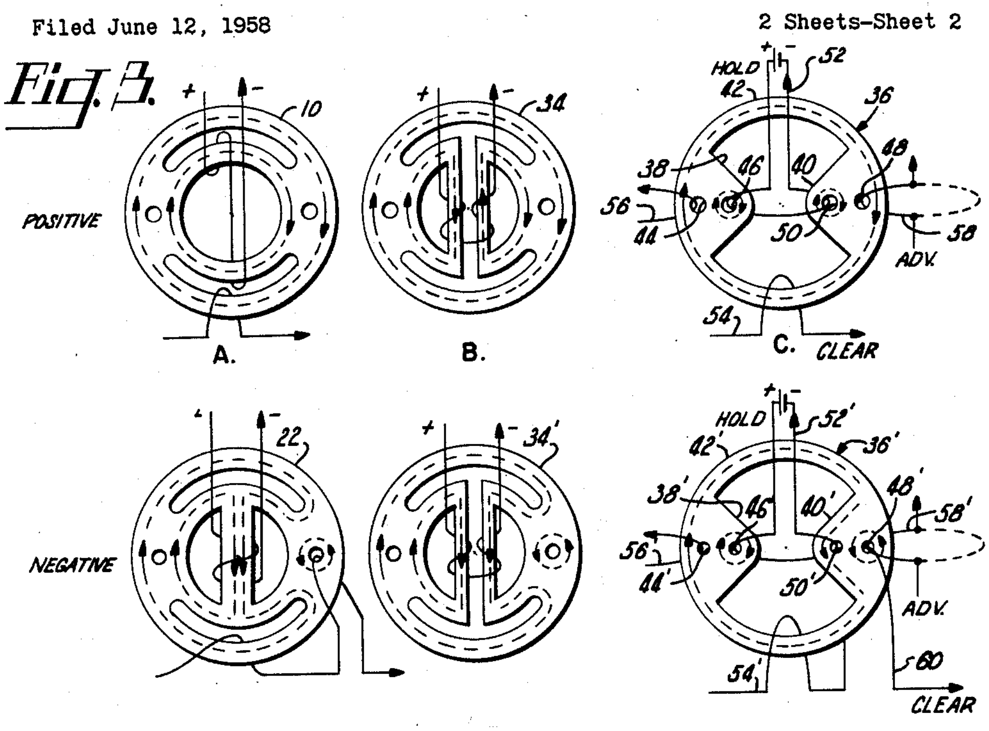
Fig. 3 shows by a series of steps how each of the core elements of Fig. 1 and Fig. 2 respectively can be modified into a core of identical shape for both a straight transfer and a negating transfer type of circuit.

According to the present invention a core element may be shaped so that the input and output apertures can function either as in the straight transfer circuit of Fig. 1 or the negating transfer circuit of Fig. 2, depending upon the manner in which it is wired. Fig. 3 illustrates by a series of steps at A, B, and C respectively how a positive core device or a negative core device, of the types described in Figs. 1 and 2, can be transferred into a common or universal core element which may function either as a positive or negative core device. Thus in Fig. 3A the positive device 10 is shown in the same condition as illustrated in Fig. 1A and described above, while the negative device 22 is shown the same as in Fig. 2A and described above.

In Fig. 3B, the positive element has been modified as indicated at 34 to provide a pair of central legs in which the flux is directed in opposite directions. It will be seen that the flux condition of the input and output apertures as shown in Fig. 3A is unaffected by the modification of Fig. 3B. Similarly the negative device 34′ of Fig. 3B shows the central legs split in two parts but with the flux directed in the same direction in both legs. Again it will be recognized that the flux condition of the input and output apertures is unaffected by the modification of Fig. 3B. The shape of the core element in Fig. 3B for both the positive and negative core devices is identical. The core element can be further modified to reduce the length of the inner flux paths formed by the central leg down to a minimum size, resulting in simple projections on the inner radius of the annular core in which are located a pair of apertures as shown in Fig. 3C.

As evident in Fig. 3C, the core elements 36 and 36′ are physically identical. However, the associated circuitry to utilize the core elements for either straight transfer or for negation differ. Physically the core 36 includes a pair of enlarged portions 38 and 40 extending inwardly from the substantially annular portion 42 of the core. The enlarged portion 38 has a pair of apertures 44 and 46 extending therethrough which divide the enlarged portion of the core into three parallel flux paths. Similarly the enlarged portion 40 includes a pair of apertures 48 and 50 which divide the enlarged portion 40 into three parallel flux paths. It is significant, as will be apparent by comparing the core element 36 with the core elements 10 and 22 from which it is evolved, that the annular portion 42 has substantially the same cross-sectional area as the outer flux paths formed by the apertures 44 and 48 respectively.

To operate the core element 36 as a straight transfer device or positive element, a hold winding 52 is provided which links the inner apertures 46 and 50. The hold winding 52 passes through the apertures in a direction such that flux is held saturated in the inner legs of the two enlarged portions in opposite directions, as indicated by the arrows. A clear winding 54 links the core and a current may be pulsed through the clear winding in a direction to clear the flux around the closed flux path formed by the outer annular portion 42 in the core 36 in a clockwise direction, as indicated. The arrows in the parallel flux paths in each of the two enlarged portions of the core element indicate the direction of flux when the core is in the cleared or zero state.

If a current is passed through an input winding 56 linking the aperture 44, the current passing through the aperture in the direction indicated, it will reverse flux in the outer leg formed by the aperture 44. This results in reversing of flux in the middle path between the apertures 48 and 50 of the enlarged portion 40. The reason it does not result in flux switching is the outer leg formed by the aperture 48 is because the aperture 48 is normally linked by an output winding 58 which provides a very low impedance current-conductive loop linking the other core element, in the manner taught in the above-mentioned copending applications. With the flux reversed in the middle leg of the enlarged portion 40, it will be recognized that the aperture 48 is in the unblocked condition corresponding to the set state described above in connection with Fig. 1B. Thus it will be apparent that with the core element 36 provided with suitable windings as above described, the core device 36 can function as a positive core device.

To provide the negation function, the identical core element, as indicated at 36′, is used with the windings modified in the manner indicated. The input winding 56′ is unchanged. The clearing winding 54′, however, has an additional winding 60 which links the output aperture 48′ so that the clearing of the core element 36′ unblocks the output aperture in the same manner as described above in connection with Fig. 2A. The output winding 58′ is arranged so that an advance current is passed in the opposite direction through the output aperture 48′ in reading out from the core. Also the hold winding 52′ is wound through the inner apertures 46′ and 50′ in a direction so as to provide flux in the same direction in the two inner legs, as indicated by the flux arrows. Thus it will be seen that the core 36′ when cleared has the identical flux pattern around the input and output apertures as shown in Fig. 2A for a negation device.

When a current exceeding the threshold level $I_t$ is applied to the input winding 56′, flux is reversed in the outer leg formed by the input aperture 44′. The flux does not switch in the outer leg formed by the aperture 48′ because the outer leg is already saturated with flux in the same direction. The flux does not switch in the inner leg formed by the aperture 50′ because of the hold winding 52′. Again this results therefore in reversal of flux in the middle leg between the aperture 48′ and 50′, causing the output aperture 48′ to be blocked, in the same manner as described above in connection with Fig. 2B.

Thus it will be evident that the core element 36' can be made to function as a negating device in the same manner as the core element described in connection with Fig. 2.

As discussed in detail in copending application Serial No. 718,883, filed March 3, 1958 in the name of Hewitt D. Crane, it is desirable from the standpoint of optimum circuit operation that the core material be shaped so as to insure maximum saturability of all material in the cleared state. This is important to obtain maximum allowable range of the current level of the transfer pulses and to improve discrimination between the transfer of binary zeros and binary ones. Another geometric factor in designing the core for a negation circuit, as described in the above-mentioned copending application Serial No. 703,003, is that the region around the output aperture preferably be constricted in cross-sectional area to insure that a reading in of a binary one results in a completely blocked output aperture.

Figure 4:
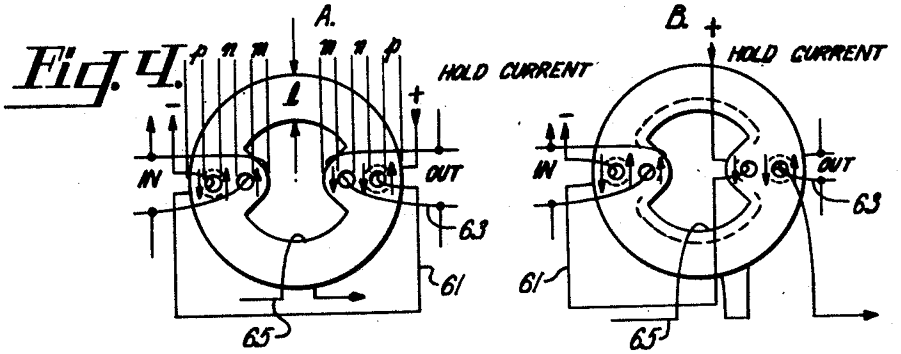
Fig. 4 shows alternative ways of wiring a core element according to a modified form of the present invention for operation as a positive core device or a negative core device with the same cleared flux configuration in both cases.

One way of modifying the core structure from that described in connection with Fig. 3C to better satisfy these geometric factors is illustrated in Fig. 4 in which Fig. 4A shows a positive core device and Fig. 4B shows a negative core device. The circuit arrangement of Fig. 4 provides the same clear configuration in the core element, whether used as a positive device or a negative device. The only change in wiring is that the hold winding, indicated at 61, and the output winding, indicated at 63, are interchanged as far as apertures are concerned and, in the case of the negation device, the clear winding, indicated at 65, is arranged to also link the output aperture.

In operation, it should be observed that the switched input flux is controlled to always switch flux only in the central leg of width $n$ in the output region of the core. In order to satisfy the requirement that a constriction in the core material be provided in the region around the output aperture, it is necessary that the width $n$ of the central leg be smaller than the width $l$ of the annular portion of the core by some appropriate percentage, depending upon the specific material. Furthermore, in order that maximum saturation of all material be achieved in the cleared state, the width $m$ of the inner leg and width $n$ of the center leg combined should be equal to the width $p$ of the outer leg plus width $l$ of the annular portion of the core. This may be expressed as $p+l=m+n$, or $m=(l-n)+p$. Since as stated above, it is desirable that $(l-n)$ should in effect be positive, it therefore follows that the width $m$ of the inner leg should be greater than the width $p$ of the outer leg. Because switching of flux is limited to the middle leg, the maximum amount of output flux is proportional to the cross-sectional area of the middle leg. Thus the outer leg should be equal to or greater than the middle leg in order to make full use of the available flux in the output. It is preferable to make the width $p$ of the outer leg equal to the width $n$ of the middle leg, and accordingly make the inner leg equal to the width $l$ of the annular portion of the core. Relative widths are discussed here for simplicity on the assumption that the thickness of the core element is fixed. Actually it is the cross-sectional areas of the legs that are important in these considerations of geometry of the core element.

Figure 5:
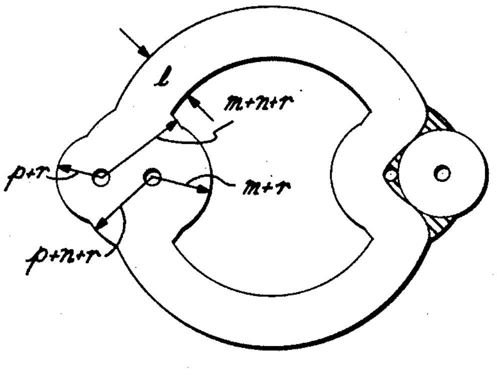
Fig. 5 shows a way of shaping the core to achieve maximum saturation for the cleared condition of the circuit of Fig. 4.

With these limitations on the core dimensions it is possible to provide the effect of constrictions around the output aperture since the middle leg is smaller than the annular core at $l$. Because the cleared configuration is the same whether the core is operated as a positive device or a negative device, the shape of the core can be more readily designed to eliminate or substantially minimize any unsaturated regions when in the cleared state. Fig. 5 shows a core shaped to minimize unsaturated material. The size of the various radii are indicated in the figure, where $p$, $n$, and $m$ represent the width respectively of the outer, middle, and inner legs of the enlarged regions as formed by the pair of apertures therein, and $r$ is the radius of the apertures. With this configuration, only the relatively small areas indicated by the cross-hatched regions remain unsaturated when the core is in its cleared state.

Figure 6:
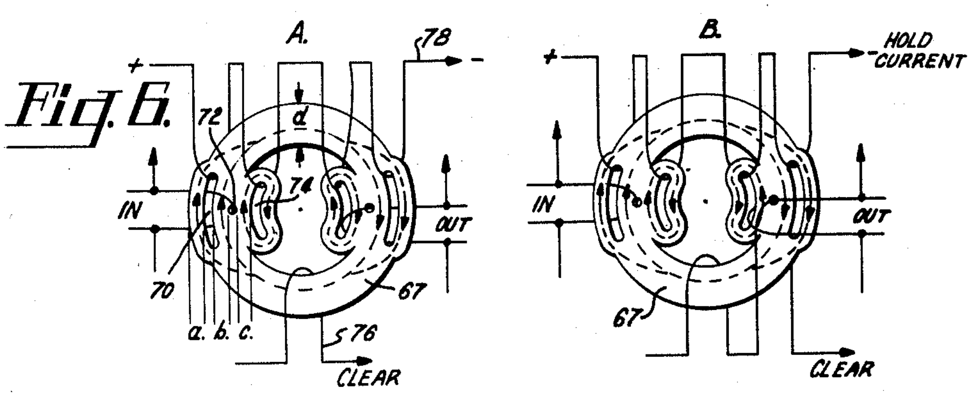
Fig. 6 shows a modified core shape for achieving the effect of constrictions around the output aperture when operating the core element as a negation circuit.

An alternative configuration which satisfies the above-defined geometrical factors is shown in Fig. 6. Fig. 6A shows a modified core element 67 wired to operate as a positive core device while Fig. 6B shows the same element wired to function as a negative core device. In this configuration, three apertures 70, 72, and 74 are provided in each of the enlarged regions, two of which are in the form of elongated slots 70 and 74 to satisfy the requirement that all the core material be saturated in the clear state.

The constriction for negation is provided by making the path $b$ smaller in cross section than the path $d$ forming the annular portion of the core.

The reason for the additional path $a$ is to make it possible to saturate the main annular portion of the core. For this reason $a+b$ is made equal to $d$. In this way when a pulse is applied to a clearing winding 76 linking the core element, the entire core material, with the aid of a hold current windings 78 linking the core element through the apertures 70 and 74, may be saturated. Since the region forming the path $a$ is magnetically held by the hold current, it takes no part in the input or output operations and provides only an appropriate flux closure path during the clearing of the core.

From the above description it will be recognized that by the present invention a single core element can be shaped so that, by appropriate wiring, it can be used to effect either a straight transfer function or a negation transfer function, i.e., it can function as a positive core device or a negative core device. The core circuits above described can be linked in chains of elements according to the teachings of the above-mentioned copending applications to effect storage and transfer of binary information without the use of diodes or unilaterally conductive devices in the transfer circuits.

What is claimed is:

1. A magnetic storage device comprising a substantially annular core of magnetic material having a square hysteresis characteristic, the annular core forming a relatively long closed magnetic flux path, the core being enlarge in at least two regions of the closed flux path, the enlarged regions each having at least two apertures extending through the core, the apertures defining three parallel flux paths in each of the enlarged regions of the core and forming relatively short closed magnetic flux paths in the enlarged regions around the respective apertures, the total cross-sectional area of the three flux paths in the enlarged region being substantially greater than the cross-sectional area of the non-enlarged portions of the annular core.

2. Apparatus as defined in claim 1 wherein input and output windings link individual ones of said parallel flux paths in the core through separate apertures respectively located in the two enlarged regions, holding windings link the core through separate apertures respectively located in the two enlarged regions, the holding windings being adapted to have unidirectional currents coupled thereto, and a clearing winding links the core through the central opening formed by the annular shape of the core for inducing flux in one direction around the relatively long closed flux path in the core in response to a unidirectional current applied thereto.

3. Apparatus as defined in claim 2 wherein the cross-sectional area of the core in regions between the enlarged regions is substantially equal to the cross-sectional area of the parallel paths in the enlarged region of the core linked by the input and output windings respectively.

4. Apparatus as defined in claim 3 wherein the cross-sectional areas of the remaining parallel flux paths in the enlarged portions of the core are substantially equal to each other and are not greater than the cross-sectional area of the portion of the core between the enlarged regions.

5. Apparatus as defined in claim 1 wherein the enlarged regions each include a third aperture, two of the apertures in the enlarged regions being elongated in a direction substantially parallel to the relatively long closed flux path, the elongated apertures being located on either side of the remaining middle aperture.

6. Apparatus as defined in claim 5 wherein input and output windings link the core element through the respective middle apertures in the two enlarged regions, a hold winding linking the core through each of the elongated apertures, and a clearing winding links the annular portions of the core.

7. Apparatus as defined in claim 5 wherein the cross-sectional area of the annular portion of the core between the enlarged regions is equal to the total cross-sectional area of the two parallel flux paths formed by one of the elongated apertures in each of the enlarged regions.

References Cited in the file of this patent

UNITED STATES PATENTS 2,869,112 Hunter ---------------- Jan. 13, 1959